United States Patent [19]

Sato et al.

[11] 4,287,403
[45] Sep. 1, 1981

[54] METHOD AND APPARATUS FOR ADJUSTING THE GAP IN AN ELECTRIC DISCHARGE MACHINE

[75] Inventors: Kunihiko Sato, Owari-Asahi; Tetsuro Urata, Nagoya; Mitsugi Kawano; Terumasa Jinba, both of Fukuyama; Yukio Kato, Kasugai; Takeo Uebayashi, Fukuyama, all of Japan

[73] Assignees: Mitsubishi Denki Kabushiki Kaisha; Nippon Kokan Kabushiki Kaisha, both of Tokyo, Japan

[21] Appl. No.: 929,438

[22] Filed: Jul. 31, 1978

[30] Foreign Application Priority Data

Aug. 1, 1977 [JP] Japan .................................. 52-92378

[51] Int. Cl.$^3$ ............................................. B23P 1/02
[52] U.S. Cl. .............................. 219/69 M; 219/69 G
[58] Field of Search ................ 219/69 M, 69 G, 69 P, 219/69 C

[56] References Cited

U.S. PATENT DOCUMENTS

| | | | |
|---|---|---|---|
| 2,979,639 | 4/1961 | Williams et al. | 219/69 P |
| 3,789,182 | 1/1974 | Verner | 219/69 P |
| 3,878,353 | 4/1975 | Anderson | 219/69 M |
| 4,021,635 | 5/1977 | Losey et al. | 219/69 P |

FOREIGN PATENT DOCUMENTS 2755772 6/1978 Fed. Rep. of Germany ........ 219/69 C

*Primary Examiner*—C. C. Shaw
*Attorney, Agent, or Firm*—Fleit & Jacobson

[57] ABSTRACT

Disclosed is an electric discharge machining method in which the electric discharge working gap between an electrode and a work piece to be machined is automatically adjusted. To detect the condition of the discharge working gap, a low voltage pulse is applied each time a plurality of high voltage pulse for electric discharge machining are applied for a predetermined time. The working current resulting from the application of each low voltage pulse is detected to control the feeding of the electrode and thereby to automatically adjust the discharge working gap to a predetermined value.

7 Claims, 2 Drawing Figures

METHOD AND APPARATUS FOR ADJUSTING THE GAP IN AN ELECTRIC DISCHARGE MACHINE

BACKGROUND OF THE INVENTION

The present invention relates to electric discharge machining methods for satinizing with a predetermined degree of roughness the surface of a work piece in roll or plate form, and more particularly the invention relates to an improved electric discharge machining method in which the feeding of an electrode is controlled to automatically adjust the working gap between the electrode and a work piece.

In the past, methods of satinizing for example the surface of strip steel rolling rolls, particularly cold rolling rolls are known in the art in which impressions are formed in the polished roll surfaces by throwing hard metal particles, e.g., shot or grit against the roll surfaces, and recently attempts have been made to perform this type of processing by means of electric discharge machining. As is well known, the electric discharge machining is a process in which an insulating liquid, e.g., kerosine is introduced into a narrow working gap between an electrode and a work piece and a pulse waveform voltage is periodically applied across the electrode and the work piece to cause discharge therebetween and thereby machine the surface of the work piece. By rotating the roll in a circumferential direction and simultaneously gradually moving the electrode in the direction of rotation of the roll while performing the discharge machining at the surface of the roll, it is possible to continuously subject the roll surface to satin finishing operation and thereby to form discharge impressions all over the roll surface.

The satin finish thusly given to the roll surface has many advantages in that as compared with the mechanical impressions formed by the blasting of metal particles, the difference in height between the depressions and protrusions is great, the resulting shape is not only far superior in uniformity but also not susceptible to the production method and the hardness of the roll used and the metal structure in the roll surface is hardened by the discharge thus making the roll best suited for use as a rolling roll.

On the other hand, with the ordinary electric discharge machining, e.g., boring operation, an electrode feed control method is used in which in order to always maintain constant the average value of the voltage at the working gap, the voltage at the working gap is compared with a predetermined reference voltage and the difference therebetween is used to control a drive unit comprising a motor, hydraulic unit or the like, and consequently the working gap will be caused to repeatedly vary on both sides of a reference value in dependence on the frequency response characteristic of the drive unit. If this control method is applied to the machining of revolving rolls to which the present invention relates, due to the oscillation or hunting of the working gap and the resulting nonuniformity of the discharge condition, the amount of machining will be caused to change with time thus causing a streaky pattern in the surface of the roll. Of course, this change in the amount of machining is so small that the effect of the change on the worked surface cannot be perceived by the naked eye and the effect can be seen only by means of a chalk test effected by applying chalk powder to the roll surface or a test employing an oil stone. However, if the roll is used as a strip steel rolling roll for final rolling purposes, the presence of such a streaky pattern tends to produce ill effects on the rolled strip steel which in turn will be rejected as off-grade product.

SUMMARY OF THE INVENTION

It is an object of the present invention to provide an electric discharge machining method in which the occurrence of a streaky pattern in the surface of a roll is prevented when the roll is subjected to the previously mentioned electric discharge machining.

It is another object of the invention to provide a method of giving a satin finish to the surface of a work piece, in which a voltage pulse train consisting of high voltage pulses and a low voltage pulse is applied across the working gap, whereby the condition between the electrodes is detected by means of the low voltage pulse to control the feeding of the electrode and the high voltage pulses are applied for a predetermined time for machining.

It is still another object of the invention to provide an electric discharge machining method in which the condition of the working gap is detected by detecting a working current caused by the application of a low voltage pulse.

It is still another object of the invention to provide an electric discharge machining method in which a working current caused by the application of a low voltage pulse is discriminated by comparing it with a predetermined reference value and the feeding of an electrode is controlled in accordance with the discrimination result to thereby maintain the discharge working gap at a predetermined value.

Other and further objects, features and advantages of the invention appear more fully from the following description.

DESCRIPTION OF THE PREFERRED EMBODIMENT

Figure 1:
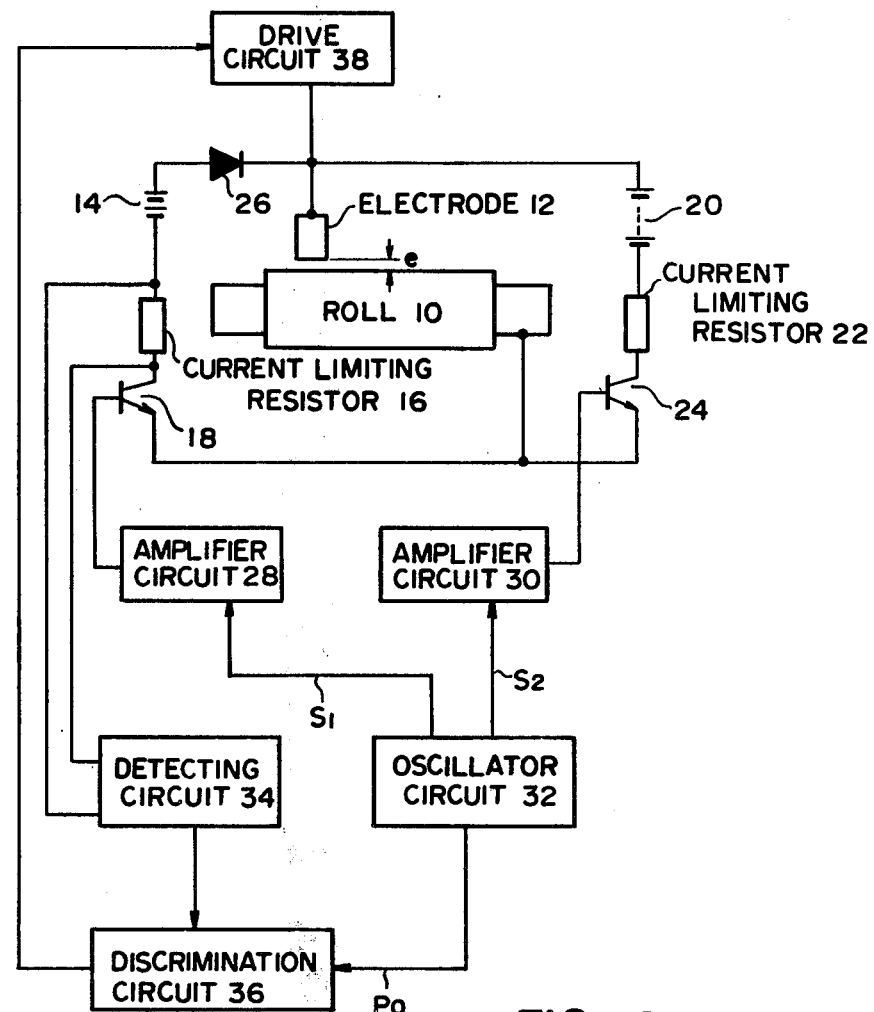
FIG. 1 is a block diagram showing a circuit construction required for performing an electric discharge machining method according to the invention.

Referring first to FIG. 1, numeral 10 designates a roll or work piece, 12 a working electrode disposed opposite to the roll 10 with a working gap e therebetween, 14 a DC power source for low voltage pulse, 16 a current limiting resistor for low voltage pulse, 18 a switching transistor for applying low voltage pulse to the electrode 12, 20 a DC power source for high voltage pulse, 22 a current limiting resistor for high voltage pulse, 24 a switching transistor for applying high voltage pulses to the electrode 12, and 26 a diode for preventing the flow of current from the high voltage DC power source 20 to the low voltage DC power source 14 when the switching transistor 24 is turned on. Numeral 28 designates an amplifier circuit for applying control pulses to drive the switching transistor 18, and 30 an amplifier circuit for applying control pulses to drive the switching transistor 24, with the amplifier circuits 28 and 30 being so designed that when the amplifier circuit 28 drives the transistor 18 the operation of the amplifier circuit 30 is inhibited, whereas when the amplifier circuit 30 drives the transistor 24 the operation of the amplifier circuit 28 is inhibited, thus preventing the transistors 18 and 24 from being turned on simultaneously. Numeral 32 designates an oscillator circuit whereby switching signals $S_1$ and $S_2$ for respectively driving the transistors 18 and 24 are generated out of synchronism with each other and a synchronizing signal $P_o$ is also generated in synchronism with the switching signal $S_1$. Numeral 34 designates a working current detecting circuit whereby when a low voltage pulse is applied to the electrode 12 in response to the turning on of the transistor 18, the resulting working current is detected in the form of a voltage signal across the current limiting resistor 16. Numeral 36 designates a discrimination circuit for discriminating the condition of the working current generated in response to the application of a low voltage pulse, that is, the working current is compared with a predetermined reference value corresponding to a predetermined working gap e and the difference or deviation for example is generated. Numeral 38 designates a drive circuit which receives the signal from the discrimination circuit 36 to actuate a feed mechanism (not shown) for the electrode 12, that is, in response to the deviation signal from the discrimination circuit 36 the working gap e of the electrode 12 is controlled so that the deviation signal is reduced to zero or brought within a predetermined range. In this connection, the discrimination circuit 36 comes into operation in response to a synchronizing signal $P_o$ generated from the oscillator circuit 32 in synchronism with a switching signal $S_1$ applied to the transistor 18 through the amplifier circuit 28 for the purpose of applying a low voltage pulse, and the feeding of the electrode 12 is controlled through the drive circuit 38 in response to the application of the low voltage pulse. It should be noted here that the roll 10 is rotated at a constant speed by a drive unit which is not shown and the electrode 12 is also controlled to move transversely.

Figure 2:
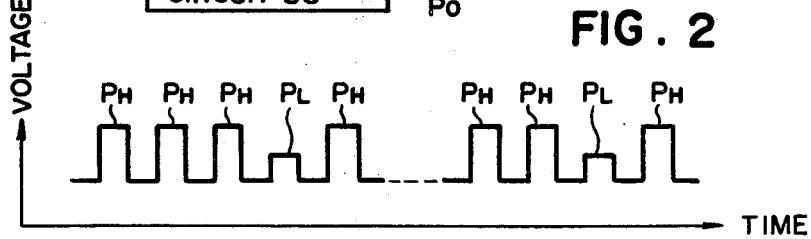
FIG. 2 is a time chart showing a voltage waveform applied across an electrode and a work piece.

With the apparatus shown in FIG. 1, in accordance with the electric discharge machining method of this invention, pulse trains each consisting of a low voltage pulse $P_L$ and high voltage pulses $P_H$ as shown in FIG. 2 are applied across the working gap e between the electrode 12 and the roll 10.

FIG. 2 shows an example of the manner in which the low and high voltage pulses are applied, and the number of low voltage pulses $P_L$ is very small as compared with that of high voltage pulses $P_H$. Namely, in FIG. 1 the switching signals $S_2$ from the oscillator circuit 32 are applied to the transistor 24 through the amplifier circuit 30 for a predetermined time, so that a predetermined number of high voltage pulses $P_H$ are applied across the electrodes in response to the turning on and off of the transistor 24 to thereby subject the roll surface to discharge machining, and after the expiration of a predetermined time the switching signal $S_1$ from the oscillator circuit 32 is applied to the transistor 18 through the amplifier circuit 28 to turn on the transistor 18 and apply a low voltage pulse $P_L$ across the electrode 12 and the roll 10. This application of high and low voltage pulses is performed repeatedly. In response to a working current generated by the application of the low voltage pulse $P_L$ a voltage proportional to the working current is generated across the current limiting resistor 16 and this voltage is detected by the detecting circuit 34. The resulting detection signal is compared with the reference value by the discrimination circuit 36 to determine the amount of feed of the electrode and the drive circuit 38 actuates the electrode feed mechanism to correct the electrode gap e. As a result, the electrode gap e is adjusted to the optimum length in response to the application of the low voltage pulse and the predetermined discharge machining condition is maintained at the time of application of the following high voltage pulses, thus causing practically all the high voltage pulses to discharge efficiently.

In particular, even if the discharge working gap e is changed by the frequency response of the drive unit, by virtue of the control of the working gap e by the method of this invention, if the amount of change $\Delta e$ of the gap is within a gap length corresponding to the voltage difference between the high voltage pulse $P_H$ and the low voltage pulse $P_L$, there is no risk of a situation arising in which the application of the high voltage pulses fails to cause discharge with the resulting change in the number of times of discharge, and practically the uniform discharge machining condition is maintained thus preventing the occurrence of a streaky pattern in the roll surface.

In this connection, although practically no discharge machining can be expected by the application of a low voltage pulse, the fact that the number of high voltage pulses is quite large as compared with that of low voltage pulses has the effect of preventing the occurrence of streaks in the roll surface due to the application of low voltage pulses and thereby preventing the occurrence of a streaky pattern in the worked roll surface. Assuming now that low voltage pulses of 80 volts and high voltage pulses of 300 volts are used, the allowable range of the change $\Delta e$ of the working gap will be on the order of $\pm 10\mu$.

In accordance with the method of this invention, the working gap correcting feed control for the electrode is accomplished only in dependence on the application of low voltage pulses which are relatively small in number with the resulting deterioration in the response to changes of the working gap. However, since any change $\Delta e$ of the working gap is allowable if it is within the range corresponding to the voltage difference between the high and low voltage pulses as mentioned previously and since no chips, etc., stick to the roll surface as in the case of the roll cutting operation, it is not essential to ensure any rapid response during the discharge machining and deterioration in the response does not give rise to any difficulty.

While the electric discharge machining method of this invention has been illustrated and described as used in giving a satin finish to the surface of rolls, the present invention is not intended to be limited to this purpose and it is needless to that the method can be applied to applications in which the work part of a work piece in plate form is moved relative to an electrode to give a satin finish to the surface of the work piece. The similar functional effects can also be expected by so arranging that the electrode is moved relative to the work piece.

It will thus be seen from the foregoing description that in accordance with the method of this invention, it is possible to give a satin finish to the surface of a work piece without any undesired oscillation of the working gap and instead the working gap can be maintained as constant as possible while maintaining the constant amount of work, thus giving an excellent finish to the surface of a work piece without causing any streaky pattern in the work surface.

What is claimed is:

1. In an electric discharge machining method comprising defining a working gap between an electrode and a work piece, controlling the feed of said electrode to adjust said working gap and moving said electrode and a work part of said work piece relative to each other thereby giving a satin finish to a surface of said work piece, the improvement comprising the steps of:

applying across said working gap, repeatedly and consecutively, a series of voltage pulse trains, each voltage pulse train consisting of a plurality of high voltage pulses followed by a single low voltage pulse;

detecting in response to the application of said low voltage pulse a working current across said working gap, comparing the working current for discrimination with a reference value corresponding to a predetermined interelectrode condition, and controlling the feeding of said electrode in accordance with the compared working current and reference value to adjust said working gap; and applying said high voltage pulses for a predetermined time to cause discharge and give a satin finish to the surface of said work piece by electric discharge machining.

2. A method according to claim 1, wherein the working current across said working gap is detected only in response to the application of said low voltage pulse.

3. The method of claim 2 wherein said low voltage pulse is of a magnitude such that substantially no discharge machining occurs in response to said low voltage pulse.

4. In an electric discharge machining apparatus comprising an electrode and a work piece defining a working gap therebetween, and means for controlling the feed of said electrode to adjust the working gap, the improvement comprising:

means for applying, repeatedly and consecutively, a series of voltage pulse trains across said working gap, each voltage pulse train comprising a plurality of high voltage pulses followed by a single low voltage pulse, wherein said plurality of high voltage pulses effect discharge across said working gap to provide a satin finish to the surface of said workpiece;

means for detecting the working current across said working gap in response to the application of said low voltage pulse; and means for controlling the feeding of said electrode to adjust the working gap in response to said working current across said working gap.

5. The apparatus of claim 4 further comprising means for moving said electrode and said work piece relative to each other to give a satin finish to the surface of said work piece.

6. The apparatus of claim 5 wherein said means for detecting comprises means for detecting the working current across said working gap only in response to the application of said low voltage pulse.

7. The apparatus of claim 6, wherein said low voltage pulse is of a magnitude such that substantially no discharge machining occurs in response to said low voltage pulse.

* * * * *